Nov. 24, 1936. W. A. BOHANNON ET AL 2,061,891
TRAY RACK
Filed Oct. 29, 1935
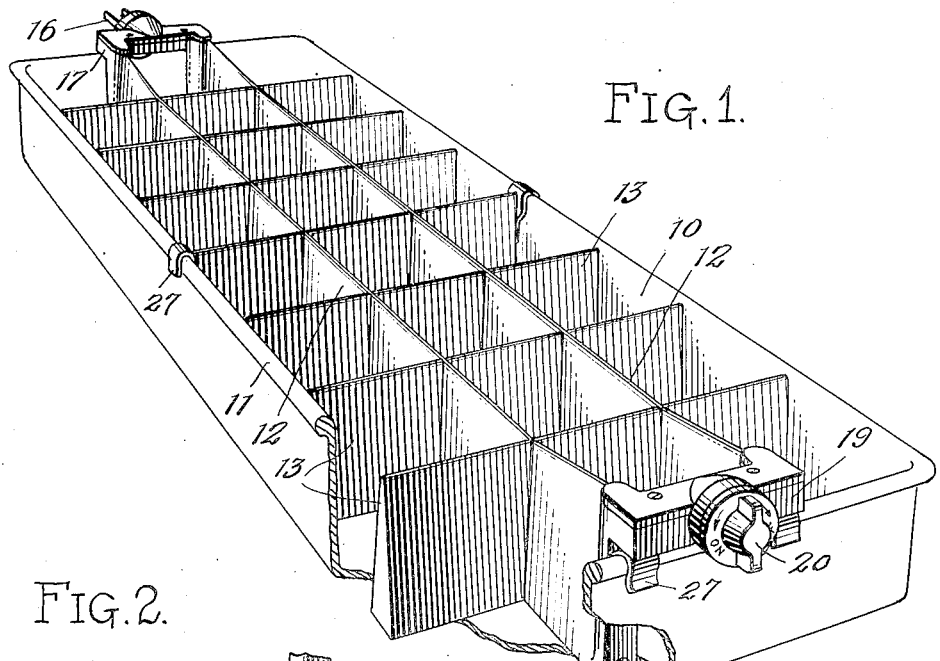
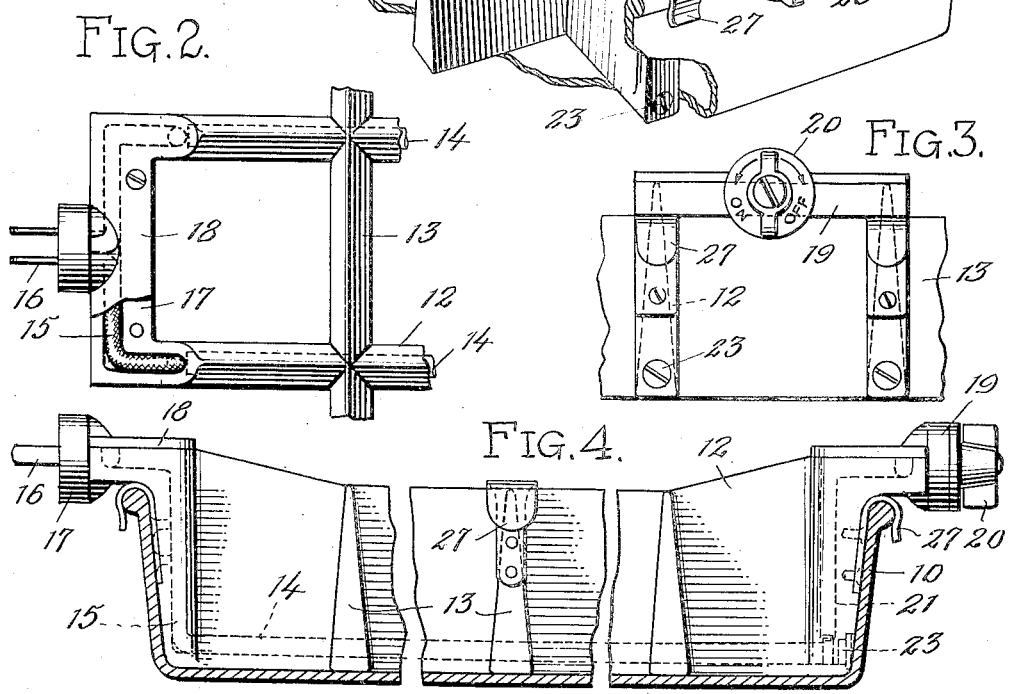
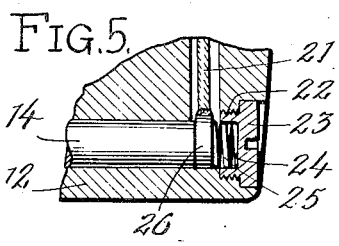
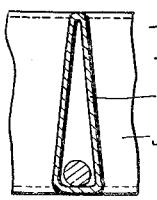
INVENTORS:
WILLIAM A. BOHANNON
CLARA B. GILBERT Patented Nov. 24, 1936

2,061,891

UNITED STATES PATENT OFFICE 2,061,891

TRAY RACK

William A. Bohannon and Clara B. Gilbert, Hewlett, N. Y.

Application October 29, 1935, Serial No. 47,260

5 Claims. (Cl. 62—108.5)

Our invention relates to tray racks for electrical or other types of refrigerators, and is particularly concerned with means for releasing the frozen contents of such trays by the introduction of heat.

We are aware that it has heretofore been proposed to introduce heat to the walls of a refrigerator tray by means of electrical heater elements housed or embedded in one or more of the walls of the tray itself. We are also aware of the fact that it is the common practice, in certain types of electrical refrigerators, to equip each tray with a removable ice cube rack or insert. We believe, however, that it is essentially novel to build into the rack or tray insert, as distinguished from the tray itself, an organization admitting of the controlled introduction of heat to both the tray and the rack.

It is our contention that a rack thus characterized has the following advantages over the devices of the prior art. In the first place, it is freely movable in the same sense as is the ordinary rack now extensively in use. When used with an ordinary tray to permit of the subsequent freezing of ice cubes, the water poured into the tray seeks a uniform level and it is unnecessary that each of a plurality of non-communicating pockets or wells be separately filled. It has been found by actual test that a double-wall tray will not admit of its contents being frozen in the same elapsed time as is possible with a single wall tray. This fact, alone, is probably responsible for the failure of the trade to adopt and use that type of combined tray and rack suggested by the prior art. In our organization a single wall tray is employed. The electrical heater elements, instead of being housed or embedded in the walls of the tray, are housed or embedded in certain only of the partitions of the removable rack. The rack per se, and not the rack and tray in combination, constitutes the structure containing the source of heat.

A better understanding of our invention will be had upon reference to the accompanying drawing, in which:

Fig. 1 is a perspective view of our improved type tray rack shown fitted in place in an ordinary refrigerator tray;

Fig. 2 is a plan view showing in detail the construction of the inner end portion of the rack;

Fig. 3 is an end view showing in detail the construction of the outer end portion of the rack;

Fig. 4 is a side elevation, partly broken away, of the rack; the tray in which the rack is adapted to be fitted being shown in longitudinal section;

Fig. 5 is a fragmentary sectional view showing a detail of construction admitting of the insertion and removal of one of the heater elements; and Fig. 6 is a fragmentary sectional view illustrating a modified form of rack partition.

In the embodiment of the invention selected for illustration, an ordinary metal refrigerator tray is shown. As is customary in trays of this kind the walls 10 thereof are solid throughout, of a single thickness, and are provided with a beaded or thickened rounded edge 11 for added strength.

Within the tray is adapted to be closely fitted a freely removable rack. Said rack preferably comprises two or more longitudinally extending partitions 12 and a greater number of transversely extending partitions 13. Said partitions, at their several points of intersection, are preferably integrally united, and each at its opposite ends, is adapted to bear firmly against the inner side and end walls of the tray. In cross section, the partitions 12 and 13 widen from top to bottom and each along its bottom edge is adapted to bear firmly against the inner bottom wall of the tray.

Within each longitudinally extending partition 12 a suitable electrical heater element 14 is fitted. These elements 14 are preferably connected in series, and each at its inner end is in electrical contact with a suitable conductor 15 joined at its opposite ends to one of two contact elements 16 mounted to overhang and extend beyond the inner end of the tray. As a support for the contact elements 16 a bridge piece 17 extends from one to the other of the longitudinally extending partitions 12 and, viewed from the side (see Fig. 4), rests upon and extends rearwardly beyond the inner end of the tray. The conductors 15 connecting the heater elements and the contact elements are preferably fitted in grooves formed in the bridge piece, and when thus fitted are adapted to be completely housed in by a removable bridge piece cover plate 18. A plug (not shown) is adapted to receive the contact elements 16 when the rack is in use.

At the opposite ends of the longitudinally extending partitions, a second bridge piece 19 is formed. This latter bridge piece is in all essential respects similar to the bridge piece 17 except that it overhangs and extends beyond the outer rather than the inner end of the tray. Instead of contact elements such as the contact elements 16, the bridge piece 19 is provided with a suitable electrical switch 20. By means of the switch 20 the electrical circuit of which the heater elements 14 and the contact elements 16 form a part, is made and broken as desired.

To the end that the heater elements 14 may be inserted and removed when necessary, and with a view to insuring electrical contact between said elements and the conductors 21 at the forward end of the rack, an opening 22 is formed in each longitudinally extending partition, in coincidence with the bore of said partition within which the heater element is fitted. Each said opening 22 is internally threaded to receive a removable plug 23. Said plugs, it will be noted, are recessed, as at 24, and in each recess a spring 25 is placed so as to bear at its opposite ends against the plug and a contact disc 26, respectively. The contact discs 26 are carried by the conductors 21 and are held firmly against the heater ends by the springs 25. Thus arranged, expansion and contraction of the heater elements, due to temperature changes, may occur without contact between the conductors 21 and the heater elements 14 being disestablished.

To hold the removable rack firmly in place during use, spring clips 27 are provided at the ends of certain of the partitions 12 and 13, which said clips overhang and more or less firmly engage the beaded edge 11 of the tray.

A rack thus constructed can be used or not as desired. If used, it is fitted within the tray in the manner shown in Fig. 1. When ice cubes are needed, the tray is filled with water to the proper level and with the rack in place, inserted in the freezing chamber of the electrical refrigerator in connection with which said tray and rack are intended to be used. To remove the tray and rack, even though the former may have frozen to its support, as well as to admit of the ready removal of the ice cubes when formed, it is only necessary to turn on the electrical current for a moment. This is accomplished by manipulating the switch 20 with the tray still within the freezing chamber and the contact elements 16 still in contact with the plug (not shown). As electrical current is passed through the heater elements 14, the latter will generate heat within the longitudinally extending partitions 12. The heat thus generated is passed by conduction not only through the longitudinally extending partitions 12, but also through the transversely extending partitions 13, and by further conduction on into the walls of the tray. Said parts having been thus quickly heated, the tray itself is loosed from its support and the ice cubes loosed from the walls of the tray and the partitions. Once loosed (and only a fraction of a minute is required), the tray can be withdrawn and each cube as needed, removed from the tray. No difficulty whatsoever is at any time encountered. What has heretofore been a more or less tedious and troublesome undertaking has, by the present invention, been made easy, rapid and orderly.

In the modification of Fig. 6, the partitions 30 and 31 therein illustrated are shown as being of a hollow construction throughout. In other respects, the rack of the modification is the same as that illustrated in Fig. 1.

It may also be pointed out that, if desired, a rack such as herein proposed may be made adaptable to refrigerators now in use. Instead of relying upon a plug formed in the refrigerator at the back of the freezing chamber, the rack may be reversed as to its position within the tray and current supplied to the heater elements by means of a flexible cord connection and a suitable plug. Where such a rearrangement is employed no switch, such as that indicated at 20 in the preferred arrangement, need be provided.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. As an article of manufacture, a removable rack for refrigerator trays comprising intersecting partitions, an electrical heater element housed within and extending longitudinally of one said partition, and a contact element carried by said rack and electrically connected with said heater element, said contact element being mounted at one end of said rack to overhang and extend beyond one end of the refrigerator tray within which said rack is adapted to be fitted.

2. As an article of manufacture, a removable rack for refrigerator trays comprising intersecting partitions, an electrical heater element housed within and extending longitudinally of one said partition, a contact element carried by said rack and electrically connected with said heater element, and means at one end of said rack to make and break the electrical circuit of which said heater element and said contact element form a part, said means being adapted to overhang and extend beyond one end of the refrigerator tray within which said rack is adapted to be fitted.

3. As an article of manufacture, a removable rack for refrigerator trays comprising intersecting partitions, an electrical heater element housed within and extending longitudinally of one said partition, a contact element carried by said rack and electrically connected with said heater element, said contact element being mounted at one end of said rack to overhang and extend beyond the corresponding end of the refrigerator tray within which said rack is adapted to be fitted, and means to make and break the electrical circuit of which said heater element and said contact element form a part mounted at the opposite end of said rack to overhang and extend beyond the corresponding end of the refrigerator tray within which said rack is adapted to be fitted.

4. As an article of manufacture, a removable rack for refrigerator trays comprising integrally united longitudinally extending and transversely extending partitions, electrical heater elements housed within and extending longitudinally of at least two of said longitudinally extending partitions, a bridge piece interconnecting said two longitudinally extending partitions at one end thereof, contact elements carried by said bridge piece and electrically connected with said heater elements, said contact elements being adapted to overhang and extend beyond one end of the refrigerator tray within which said rack is adapted to be fitted, and means to make and break the electrical circuit of which said heater elements and said contact elements form a part.

5. As an article of manufacture, a removable rack for refrigerator trays comprising integrally united longitudinally extending and transversely extending partitions, said partitions being adapted to bear endwise and bottomwise against the side and end walls and the bottom wall respectively of the tray, electrical heater elements housed within and extending longitudinally of at least two of said longitudinally extending partitions, a bridge piece interconnecting said two longitudinally extending partitions at one end thereof, contact elements carried by said bridge piece and electrically connected with said heater elements, said contact elements being adapted to overhang and extend beyond one end of the refrigerator tray within which said rack is adapted to be fitted, and means carried by the rack to make and break the electrical circuit of which said heater elements and said contact elements form a part.

WILLIAM A. BOHANNON.
CLARA B. GILBERT.